United States Patent [19]
Nordstrom

[11] 4,046,186
[45] Sept. 6, 1977

[54] CARGO CONTAINER OPENING COVER

[75] Inventor: Arnold B. Nordstrom, Torrance, Calif.

[73] Assignee: Transequip Inc., El Segundo, Calif.

[21] Appl. No.: 657,607

[22] Filed: Feb. 12, 1976

[51] Int. Cl.² ............................................. A47H 3/00
[52] U.S. Cl. .................................. 160/368 R; 220/1.5
[58] Field of Search ................. 160/368; 220/1.5, 200; 244/118 R, 137 R; 105/366 R, 377, 467, 469

[56] References Cited

U.S. PATENT DOCUMENTS

| | | | |
|---|---|---|---|
| 3,082,899 | 3/1963 | Squier et al. | 220/1.5 |
| 3,294,034 | 12/1966 | Bodenheimer et al. | 244/118 R |
| 3,485,406 | 12/1969 | Borden | 220/1.5 |
| 3,591,034 | 7/1971 | Lohr | 220/1.5 |
| 3,645,596 | 2/1972 | Russell-French | 220/1.5 |
| 3,882,575 | 5/1975 | Jolly | 160/368 R |

*Primary Examiner*—Peter M. Caun
*Attorney, Agent, or Firm*—Lindenberg, Freilich, Wasserman, Rosen & Fernandez

[57] ABSTRACT

A weatherproof cover for an opening in a cargo container comprising a flexible curtain secured across the top of the opening by a header, rails secured to the sides and bottom of the opening with flanges extending away from the opening, and a cable in a tunnel sewed into the periphery of the curtain which overhangs the rail flanges. One end of the cable is secured to the header on one side, and the other end is secured to a sheave in a ratchet assembly on the other side of the header. The ratchet assembly is used to pull the cable tight against the rails under their flanges. A fitting on the curtain comprised of a hub and a sheave is provided at each lower corner for the cable. The hubs of the curtain fittings are placed over posts on gussets at the lower corners of the container opening. Diagonal cables in tunnels sewn in back of the curtain reinforce the curtain and the container itself.

10 Claims, 13 Drawing Figures

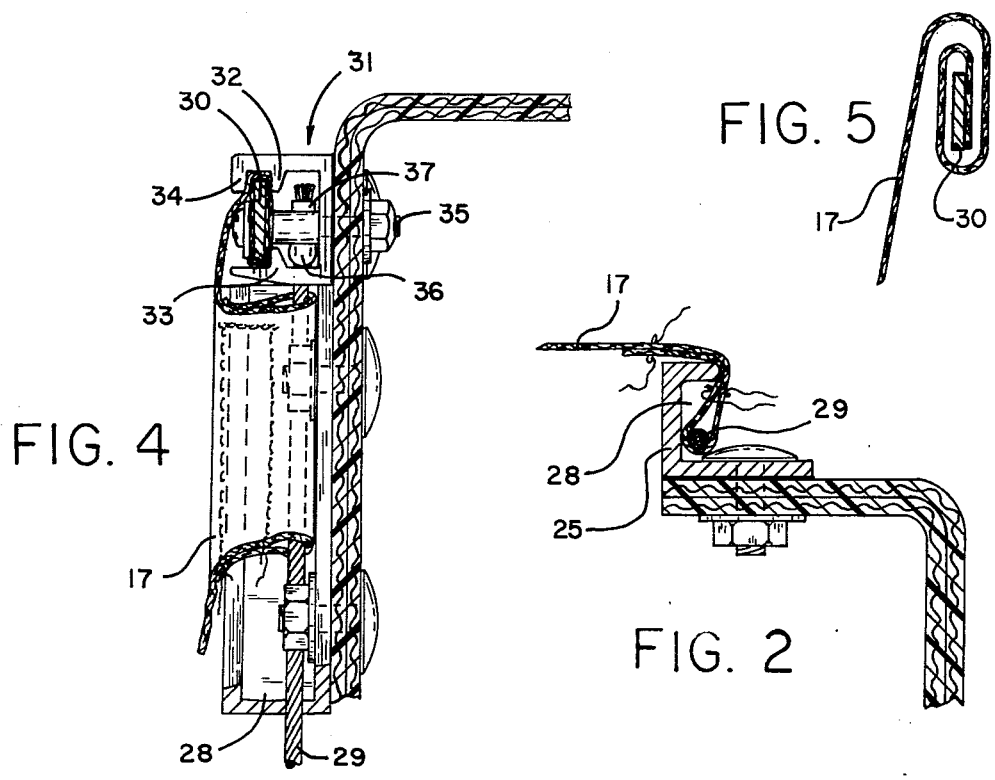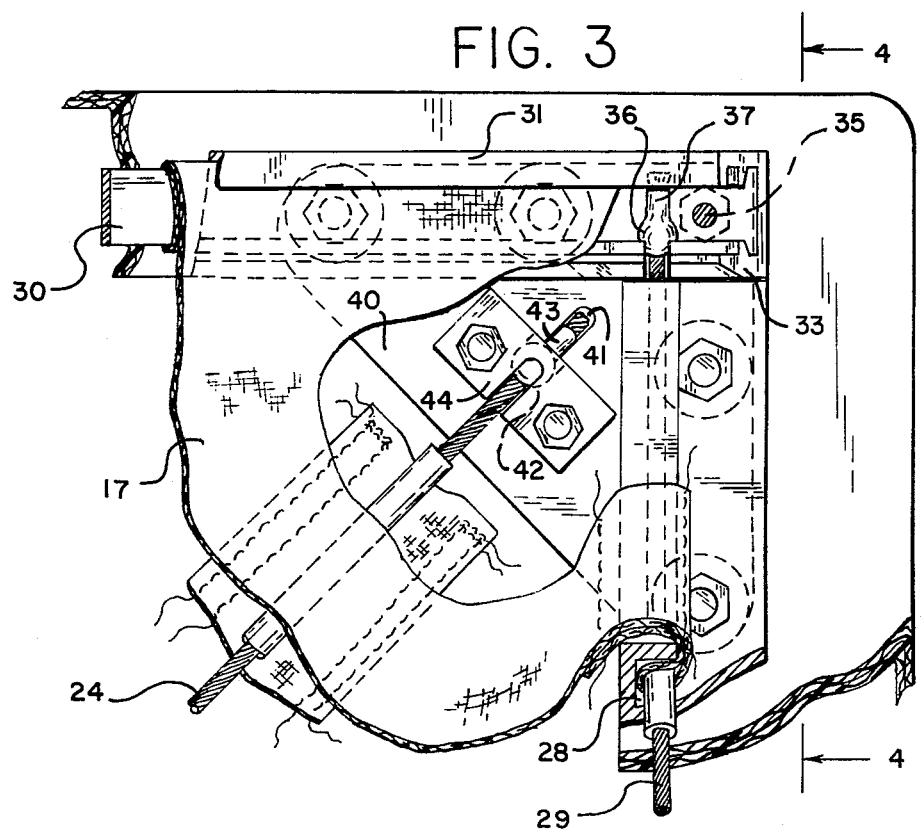

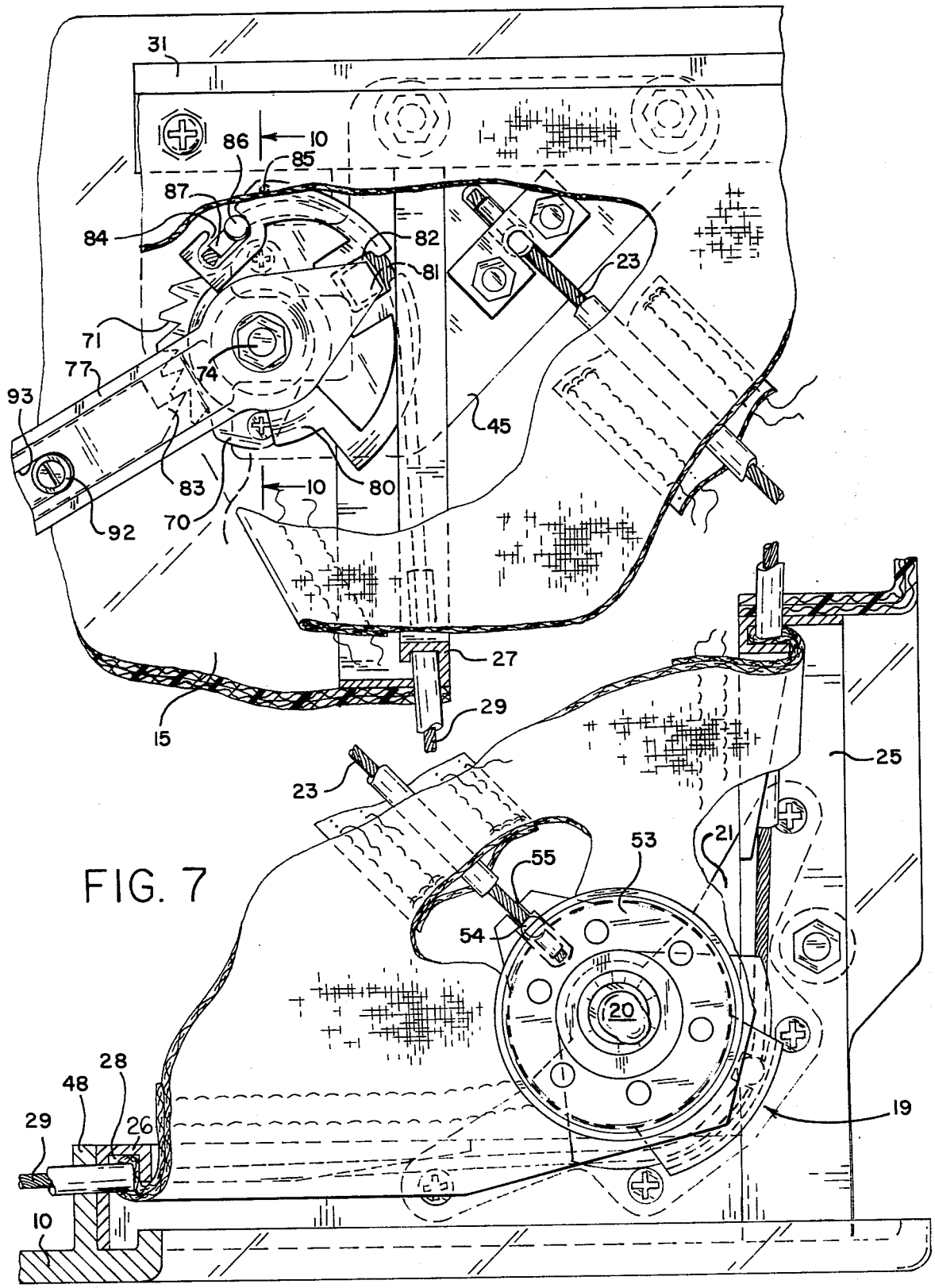

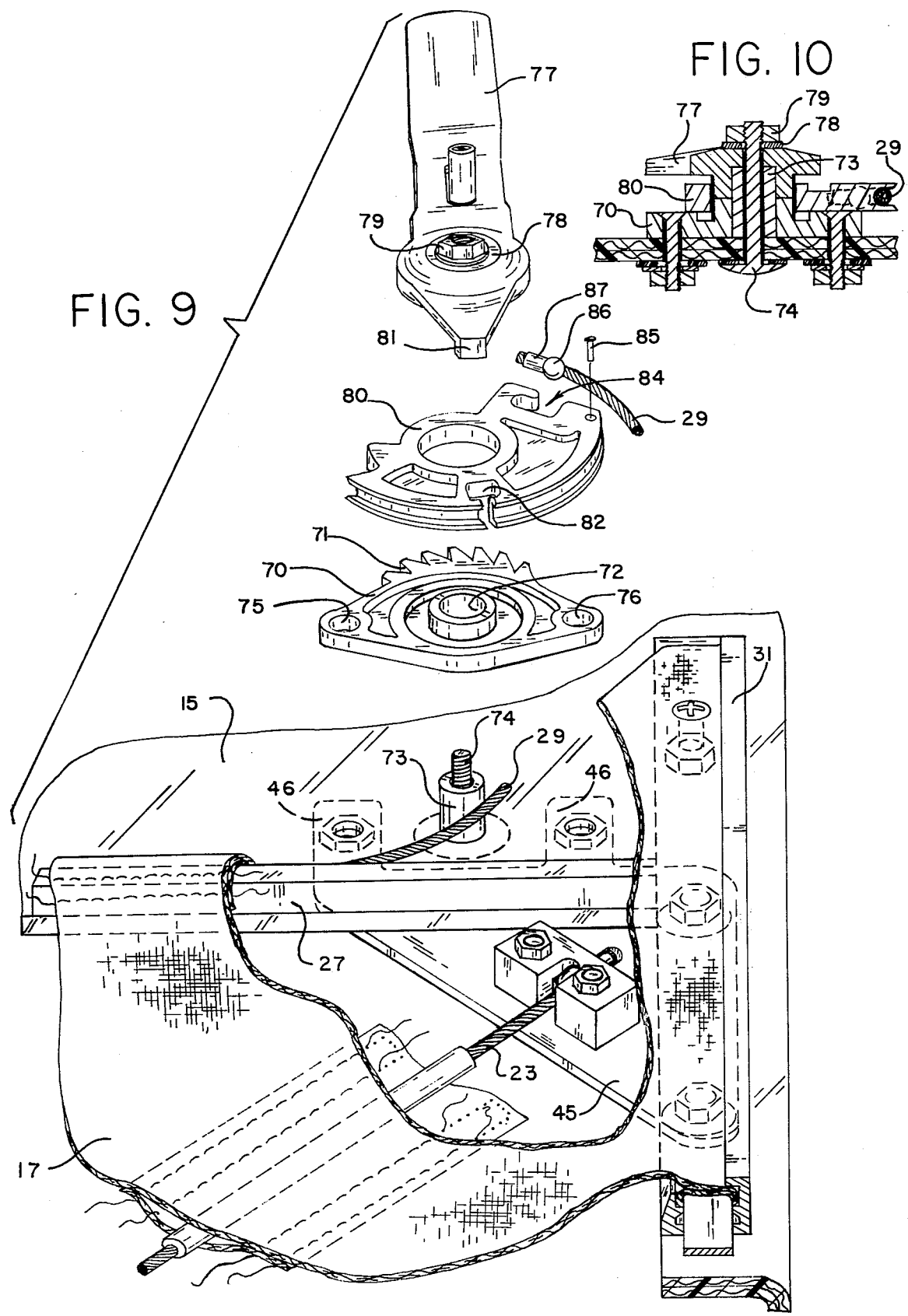

CARGO CONTAINER OPENING COVER

BACKGROUND OF THE INVENTION

This invention relates to cargo containers, and more particularly to containers for cargo to be borne by aircraft, such as baggage in passenger aircraft and freight in other aircraft.

To expedite loading and unloading cargo (freight or baggage) at aircraft terminals, it has become common practice to make up a shipment of cargo destined for a common terminal in a container which can be preloaded. The loaded container can then be quickly lifted into the fuselage of the aircraft. In that manner the aircraft is detained a minimum of time. At the destination point, the aircraft can be just as quickly unloaded. In the case of passenger aircraft, for example, the aircraft may be dispatched to its next destination while the cargo container carried to a baggage claim area is unloaded.

The cargo containers are rigid structures with side openings. For security and protection against weather, the openings are covered with some type of door. Once the container has been carried from an aircraft to a secure area protected against weather, the covering is removed. A problem in providing a covering is sealing the covering around the edges. This is a serious problem since containers must often be carried from an aircraft to the secure area in heavy rainstorms accompanied by wind and/or backwash from other aircraft. Unless the opening is well sealed, rain may be driven into the container.

In the past, openings in a container have been covered by rigid doors in order to provide conventional sealing around the edges of the door. This approach has not been entirely satisfactory since the walls of the container are necessarily thin and while the container walls may be regarded as rigid, they flex while being moved. As a consequence, the edges of the doors may separate from the walls of the container sufficiently to allow water to enter. Therefore any sealing arrangement used must allow for the container to flex away from the doors and still maintain the weatherproof integrity of the container. Various sealing arrangements for rigid doors have been suggested or used, but they have been unsatisfactory in respect to minimizing the weight of the empty container, and/or minimizing the complexity of fastening the door in a closed and sealed position. Previous closure latching systems have required that fairly extensive instruction placards be affixed to the container or door to aid in operating the system.

OBJECTS AND SUMMARY OF THE INVENTION

An object of this invention is to provide a flexible weatherproof covering for an opening in a cargo container.

Another object is to provide a covering for a cargo container opening that is easy to operate and substantially obvious in its method of operation.

Still another object is to provide a light-weight covering for an opening in a cargo container.

These and other objects of the invention are achieved by a flexible curtain fastened by suitable means to an outside wall of a container along one side of an opening in the wall. A rail is provided around the opening from one end of the curtain fastening means to the other. A flange extends from the outer edge of the rail away from the opening in a plane substantially parallel to the cargo opening. A substantially continuous cable tunnel is provided around the periphery of the curtain from the one end to the other of the curtain fastening means. A cable passed through the tunnel has one end securely fixed at the one end of the curtain fastening means. The other end of the cable is secured to the other end of the curtain fastening means by a cable tensioning means. The curtain is shaped to fit over the opening with enough overlap for the cable to be turned under the rail flange. When the curtain is placed in a covering position over the opening with the cable under the rail flange, the cable is pulled tight against the rail by the tensioning means. That secures and seals the curtain around the container opening. The opening is preferably rectangular to facilitate loading and unloading cargo from the container, but in the broadest aspects of the invention, the opening could have other shapes, such as one having rounded corners opposite the curtain fastening means with a radius for the rounded corners being as large as desired, even as large as half the width of the opening.

To facilitate passing and tensioning the cable around more nearly square corners opposite the curtain fastening means, the tunneling for the cable is omitted at each such corner of the curtain, and is instead passed over a groove in the rim of a sheave fastened to the inside of the curtain by a fitting having a hollow hub on which the sheave turns. To secure the corners of the curtain in place while the cable is being tensioned, the hubs of the curtain fittings are slipped over posts protruding outwardly from gussets at respective corners of the opening. Each fitting has a knob on the outside of the curtain to facilitate removing the fitting from its corner post. To facilitate placing the curtain fittings over the corner posts, the rail flanges are terminated on each side of the corners at about where the gussets begin. At the other corners, where the curtain is fastened to the container, the rail flanges extend substantially to the fastening means.

The curtain fastening means is preferably comprised of a hollow rectangular header open through its entire length on one side and having a side opposite the opening fastened and sealed to the outside of the container above the container opening. Two flanges on the inside of the header, and opposing each other on horizontal sides of the header, provide a backing for a rigid strip inserted into the header broadside. The curtain is wrapped around the strip before it is so inserted. Another flange outside of and parallel to the flange on the upper horizontal side retains the upper edge of the prewrapped strip in position. The direction of wrapping for the curtain is so selected that the curtain emerges from the header at the upper edge of the strip, whereby the weight of the curtain pulling the upper edge of the strip outwardly against the upper outer flange forces the lower edge of the strip inwardly against the lower flange to assure a tight seal of the curtain in the header.

To strengthen the flexible curtain, diagonal cables are provided through tunnels on the inside of the curtain. The upper end of each diagonal cable is secured at a separate end of the curtain fastening means, preferably to gussets at the corners. The other end of each fastening means is secured to a curtain fitting. When the curtain fittings are in place over their respective corner posts, the diagonal cables not only strengthen the curtain but also reinforce the container at its opening.

BRIEF DESCRIPTION OF THE DRAWINGS

FIG. 2 is a sectional view taken on a line 2—2 in FIG. 1.

FIG. 3 illustrates the upper right corner of a curtain closing an opening in the container of FIG. 1.

FIG. 4 is a sectional view taken on a line 4—4 of FIG. 3.

FIG. 5 illustrates the manner in which the curtain shown in FIG. 1 is wrapped around a strip inserted into a header as shown in FIGS. 3 and 4.

FIG. 7 is a front elevation of the curtain fitting of FIG. 6 fully assembled.

FIG. 8 illustrates the upper left corner of a curtain closing the opening of the container of FIG. 1 according to the present invention.

FIG. 9 is an exploded view of a cable tensioning ratchet and sheave assembly in the upper left corner of the container of FIG. 1 shown in FIG. 8.

FIG. 10 is a sectional view taken on a line 10—10 in FIG. 8.

DESCRIPTION OF PREFERRED EMBODIMENTS

Figure 1:
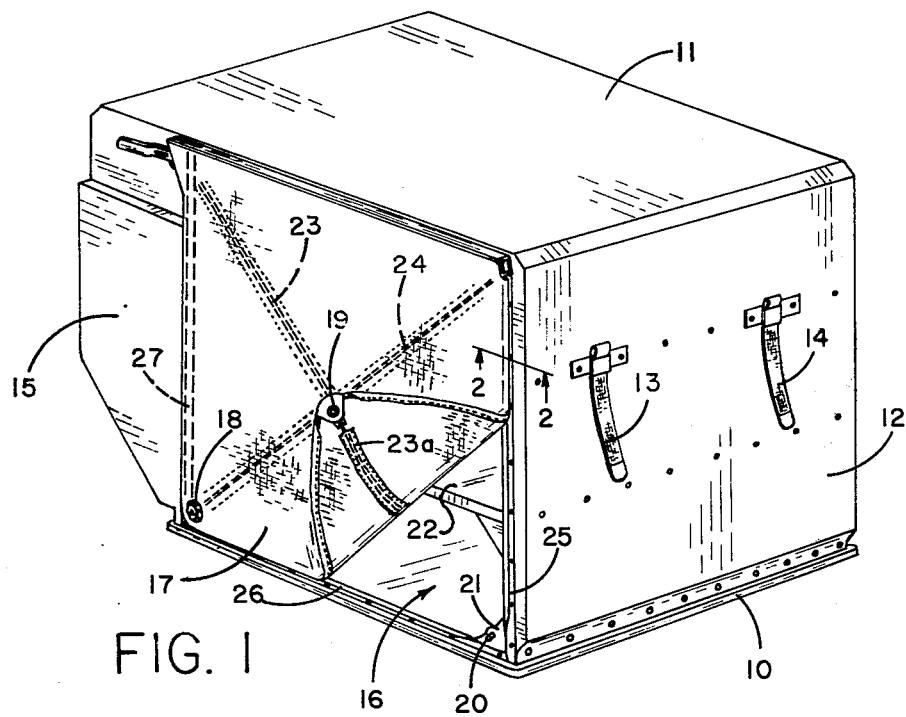
FIG. 1 is an isometric view of an exemplary cargo container embodying the present invention.

Referring now to the drawings, FIG. 1 shows in an isometric view an air cargo container comprised of a base 10, a roof 11, and an end panel 12 having two handling straps 13 and 14 attached thereto. To complete the container, there is opposite the end panel 12 an end panel that slopes in at the bottom. There is also a panel 15 over a part of the near side of the container as viewed in the drawing, and a corresponding panel on the other side. A rectangular (very nearly square) opening 16 on the near side of the container is covered by a flexible curtain 17 which closes and seals the opening 16 when fittings 18 and 19 at the lower corners of the curtain are placed over posts on corner gussets, such as a post 20 on a gusset 21 at the lower right corner.

The far side of the container is also provided with an opening covered and sealed by a curtain in the same manner. Since the curtain assembly on the far side is a mirror image of the one shown on the near side, it will not be further described; only the curtain assembly on the near side will be described.

The shape of the container shown is typical of baggage containers currently in use in widebody passenger aircraft, such as the B-747 and DC-10 jet aircraft. Since the container is stowed below the passenger compartment of the aircraft, the lower corner at the far end, as viewed in the drawing, is cut off to conform to the configuration of the fuselage. Consequently, it is to be understood that the shape of the container shown is only by way of example, and not by way of limitation.

As a baggage container, it is important to have openings on both sides to quickly load and unload baggage. It is also important to have shelves on which to place the baggage so that the baggage placed on the base 10 will not be crushed by the weight of other baggage. One shelf, identified by the reference numeral 22, is shown. A second shelf above that shelf allows the baggage to be loaded in three tiers. These shelves, and supporting posts between shelves, add to the total weight of the container. Consequently, it is important to minimize the weight of the assembly emloyed to cover and seal the openings on each side. For example, a loaded container having 160 cubic feet of space filled with baggage may have a maximum gross weight of about 2,850 to 3,500 pounds. For efficient operation, the tare (weight of the empty container, including the weatherproof covers for the openings) should be held to less than about 1/10 the maximum loaded weight.

The novel cover assembly to be described with reference to the remaining figures makes it possible to achieve this objective, in conjunction with effective use of light weight material of sufficient strength in the rest of the container, such as an aluminum plate for the base, resin impregnated fiberglass fabric for the shell consisting of the roof, end panels and side panels, aluminum clad balsa for the shelves, and thin-wall tubing for the shelf support posts.

The curtain 17 is made of nylon fabric, preferably coated with a thin film of flexible plastic, such as vinyl, to improve its weatherproof quality. It could also be made of other fabric-like material that is stronger than nylon, or even stronger than canvas, to provide an opening cover that is pilfer proof. Such a pilferproof cover should also be weatherproof.

The manner in which the curtain is installed to hang over the opening 16, and how the curtain is sealed along the sides and bottom of the opening will be described with reference to the remaining figures, but first, with reference to FIG. 1, it should be noted that two diagonal cables 23 and 24 encased in vinyl sheaths are provided between corners on the inside of the curtain 17. A thin strip of the same fabric as the curtain (such as a strip 23a over the cable 23) is sewn over each cable to form a tunnel for the cable, thereby to secure it in place while the curtain is turned up over the roof. While the curtain is in place over the opening 16, the diagonal cables strengthen the curtain because at that time both ends of the cables are secured to corners of the opening. The cables are permanently secured to the upper corners of the opening, as will be described with reference to FIGS. 3 and 8, and are temporarily secured to posts in lower corner gussets through the fittings 18 and 19 which slip over the posts, as will be described with reference to FIGS. 6 and 7.

Continuing a general description with reference to FIG. 1, the curtain 16 fits over rails 25, 26 and 27 along the sides and along the bottom. The rails have an L-shaped cross section (as shown in FIG. 2 for the rail 25) to permit one side to be bolted or otherwise fastened to the container. The other side which protrudes out from the container about ½ inch, is provided with a turnback flange that extends back away from the container opening about ¼ inch in a position parallel to the one side. The flange extends the full length of each rail except near the lower corners of the container opening, as will be explained further hereinafter with reference to FIG. 6, to provide a channel, (such as channel 28 in the rail 25 as shown in a sectional view in FIG. 2 taken on a line 2—2 in FIG. 1). That channel receives a peripheral cable 29 encased in a vinyl sheath. The encased cable is passed through a tunnel double stitched into the side and bottom edge of the curtain. When this peripheral cable is seated in the rail channels, and tightly drawn by a ratchet assembly in the upper left corner (as viewed in FIG. 1), the curtain is snug over the opening to provide a sealed closure. The following description of this novel arrangement of the curtain and sealing cable will proceed from the top edge of the curtain clockwise (as viewed in FIG. 1), with emphasis on the lower corners, and the upper left hand corner. It should be noted that in folding the curtain over the cable and double stitching it to form a tunnel, a sufficient amount of the curtain is folded over to permit that portion over the turnback flange to be of double thickness, and to permit the double stitching to be spaced so that neither stitching row will bear against the flange in order to avoid excessive wear on the stitching.

Referring now to FIGS. 3 and 4, the upper edge of the curtain is bonded to a broad side of a metal strip 30. The boned strip is then wrapped in the curtain, as shown schematically in FIG. 5, and inserted into an aluminum header 31 as best shown in FIG. 4 which illustrates the end of the header in elevation in a sectional view taken along a line 4—4 in FIG. 3. The header can be described as a hollow rectangular tube having an opening on one side such that two horizontal walls extend from a back wall that is bonded (or otherwise sealed) and bolted to the container. Two opposing longitudinal flanges 32 and 33 are provided on the insides of the upper and lower horizontal walls. A third longitudinal flange 34 set out from the flange 32 on the upper wall cooperates with the flange 32 to hold the upper edge of the strip 30 in place while the lower edge of the strip is held tight against the flange 33 on the lower wall. Four or five spaced apart bolts, such as the bolt 35 shown in FIGS. 3 and 4, hold the curtain-wrapped strip in the header. The bolts carry no curtain load; they merely hold the wrapped strip in place against header flanges 32 and 33. This puts a full length grip on the curtain between the strip and the flanges 32 and 33. When the curtain is pulled tight over the container opening 16 upon tensioning the peripheral cable, the upper edge of the curtain-wrapped strip presses out against the upper flange 34 and presses in against the inner flange 33. That transfers the full length grip on the curtain from the flange 32 to the flange 34. This pressure of the strip against the flange 34 assures a tight seal along the upper edge of the curtain.

A ball 36 having an integral shank 37 is prefitted and swaged on the end of the peripheral cable. The shanked-ball end of the cable is then inserted into the hollow of the header with the cable passing downward through a slot in the lower wall 33 as shown in FIG. 3. The diameter of the ball is significantly greater (two to three times greater) than the width of the slot to form an effective anchor for the end of the cable.

As noted hereinbefore, the curtain rails are bolted to the container on the edge of its opening as shown in FIG. 2 for the rail 25 to facilitate replacing a damaged rail in the field, but in practice, the rails may be fastened with rivets, or with any other known type of fastener. In any case, the rails are fastened at close intervals, such as every five inches, to assure a tight seal between the rail and the container. To further assure a tight seal, the rails are bonded or otherwise sealed against the container before bolting.

As noted in the general discussion, the diagonal cables 23 and 24 (FIG. 1) are secured at the upper corners of the container opening. FIG. 3 discloses the manner in which this is done for the cable 24 using a gusset 40 fitted to the inside (or the outside) of the corner of the container opening. The gusset is fastened with bolts through the container wall and both the header and the rail. A slot 41 in the gusset receives the swaged shank 43 of a ball 42 on the end of the cable when the cover is thrown up on top of the container during loading. The shanked ball 42 is swaged over the end of the cable. To retain the ball, and thus anchor the end of the diagonal cable, a hollow block 44 with an open slot is placed over the cable in front of the gusset, and bolted to the gusset. A similar gusset 45 is employed to secure the upper end of the diagonal cable 23 in the upper left corner, as shown in FIGS. 8 and 9, except that the gusset there includes two lobes 46 extending to the left which provide rigid structure for securing a ratchet assembly used to tension the peripheral cable once the cover is in place with fittings 18 and 19 (FIG. 1) at the lower corners of the curtain over posts on corner gussets, such as the post 20 on the gusset 21 for the lower right corner shown in FIGS. 6 and 7.

Figure 6:
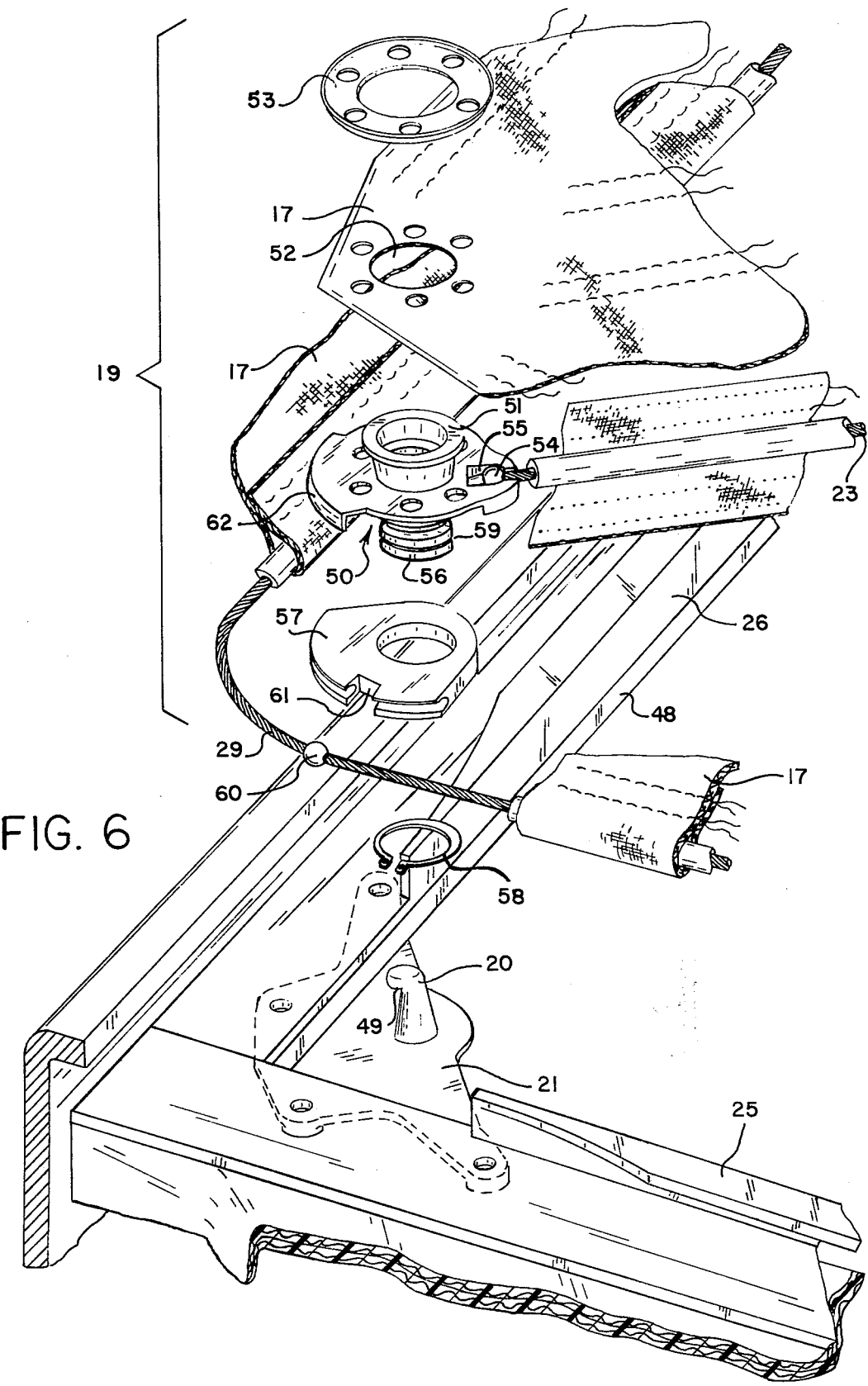
FIG. 6 is an exploded view of a curtain fitting in the lower right corner of a container opening.

Referring now to FIG. 6, holes through the curtain rails 25 and 26 receive bolts (not shown) for securing both the ends of the rails and the gusset 21 to the container. The rail 25 is secured to the fiberglass wall of the container at the edge of the opening, while the rail 26 is secured to a vertical flange 48 on the base 10 of the container. The balance of FIG. 6 relates to the fitting 19 on the lower right corner of the curtain shown in an exploded view for purposes of description. FIG. 7 illustrates the assembled fitting over the post 20. It should be noted that the post has a lip 49 at the end to retain the corner fitting. The small round end of the post and a large chamfered hole in the curtain fitting facilitates seating the fitting over the post.

Referring now to the exploded view of the fitting 19 shown in FIG. 6, a main body 50 has on one side a knob 51 that passes through a hole 52 in the corner of the curtain 17 (cut away from the rest of the curtain to permit the corner to be shown above the knob). Once the knob is inserted through the hole 52, and bonded to the main body 50, a retaining ring 53 is placed over the knob with its six holes aligned with corresponding holes in the curtain and the main body 50 for rivets or other fasteners (not shown) to secure the three elements.

Before the curtain and retaining ring are placed over the knob and secured to the main body 50, the lower end of the diagonal cable 23 is prepared with a retaining ball 54 and placed in an oblong shaped recess 55 in the main body such that, once the curtain and retaining ring are secured in place, the ball is trapped in the neck of the recess 55. Both ends of the diagonal cable 23 are thus secured, the upper end to the upper left-hand gusset 45 (FIG. 8), and the lower end to the fitting 19 (FIG. 7). Both ends of the other diagonal cable are similarly secured.

Still referring to FIG. 6, there is a hub 56 protruding from the other side of the main body 50 in the curtain fitting. This hub is adapted to receive a partial sheave 57. A retaining ring 58 fits into a slot 59 in the hub 56 to retain the sheave in place. Before the sheave is placed over the hub, the peripheral cable 29 is placed in the groove on its rim with a tight fitting ball 60 on the cable in a slot 61. When the sheave is then placed over the hub 56, a flange 62 on the rim of the main body 50 retains the cable in the groove of the sheaves rim. The purpose of the tight fitting ball on the cable is to keep the partial sheave oriented with its groove facing the corner. Otherwise, the partial sheave could rotate to a point where the groove no longer holds the cable. An alternative to this arrangement would be a full 360° sheave, but to reduce weight on the curtain fitting, a partial sheave is preferred since the full travel of the ball 60 around the corner when the cable 29 is tensioned is only about 1.5 inches for a sheave having a diameter of about 2.5 inches.

While it is preferred that the main element 50 and sheave 57 be made of light metal for durability, such as aluminum or some alloy of aluminum, plastic material could be used. Also, the flange 62 on the rim of the major body 50 could, in practice, be provided with a wedge shaped extension to function as a cam against a spring loaded latch (not shown). As the curtain fitting is pushed in over the gusset post to its seated position, the beveled surface of the wedge shaped extension would push the latch mounted on the rail 25 out of the way against the force of the lever spring. Once the curtain fitting seats, the lever passes over the wedge shaped extension to lock the curtain fitting in place. To remove the curtain from the post, the lever would be manually pushed back against the force of its spring to unlock the curtain fitting.

It should be noted that the flanges of the rails are terminated at the lower corners where the gussets begin, as shown in FIG. 6 for the lower right corner. When the curtain fitting is over the corner post, the sheave 57 will place the peripheral cable in the channels behind the rail flanges. This is possible because the curtain is of sufficient greater dimension than the container opening. Once both curtain fittings are seated on their corner posts, the peripheral cable will be in the channels of the side and bottom rails. It is then merely a matter of pulling the cable taut in the channels of the rails to seal the opening along both sides and across the bottom.

At the corners, where the rail flanges have been cut to permit the curtain fitting to be placed over the corner posts, the actual corners of the curtain not sealed against rails are backed by the gussets which support the corner posts. The gussets thus serve as splash plates at the corners to preserve the weatherproof and pilfer-proof integrity of the curtain over the container opening.

Before proceeding with a description of the ratchet assembly for tensioning the cable, the manner in which the base is made will first be described, at least insofar as it concerns the rail across the bottom of the opening. After cutting a rectangular sheet of aluminum for the base, a frame of extruded aluminum is secured along the four sides. The extrusion is designed with the vertical flange 48 extending upwardly to provide a surface to which the rail 26 is fastened across the bottom of the container opening, and elsewhere to secure the fiberglass fiber walls to the floor with nuts and bolts. Since the vertical flange 48 to which the bottom rail 26 is fastened is part of an extrusion, the rail is preferably designed as a unitary part of the extrusion. A separate rail secured to the flange is assumed in the exemplary embodiment shown in FIGS. 6 and 7 only for simplicity of description. In addition to turning the edge of the base frame up as shown in FIG. 7, it is customary to bevel the underside of the frame upwardly to facilitate moving the container on rollers into the aircraft.

Referring now to FIGS. 8 and 9, the ratchet assembly for tensioning the peripheral cable 29 is comprised of a plate 70 having sloping teeth 71 over a sector of a circle centered on a hole 72 (FIG. 9) which fits a sleeve 73 (FIG. 9) over a bolt 74 passing through the container wall 15. The plate 70 is provided with holes 75 and 76 for bolting it through the container wall 15 to the lobes 46 of the gusset 45. With the plate 70 bolted in place, the sleeve 73 is secured against lateral motion. The sleeve thus functions as a pivot for a handle 77. A recessed washer 78 and nut 79 (which threads onto the bolt 74) retain the handle on the sleeve 73 with a sheave 80 captured between the plate 70 and handle 77, as better shown in FIG. 10 which is a sectional view of the assembly taken in a plane passing through a line 10—10 in FIG. 8.

The handle 77 has a projection 81 (FIG. 9) which fits into a slot 82 in the sheave 80 so that when the handle is turned on the axis of the sleeve 73, the sheave 80 is pivoted about the same axis. However, the plate 70 is stationary so that a pawl 83 (FIG. 8) may engage the teeth on the plate and hold the handle in a cable tensioning position after the handle has been turned counter clockwise as viewed in FIG. 8. The cable 29 is positioned in a groove on the rim of the sheave 80. The end of the cable is held in a slot in the sheave 84 by a pin 85. A ball 86 having a shank 87 swaged in place on the end of the cable holds the end of the cable in the slot 84 as the sheave pivots, thus permitting the cable to be tensioned as the handle is turned.

Figure 13:
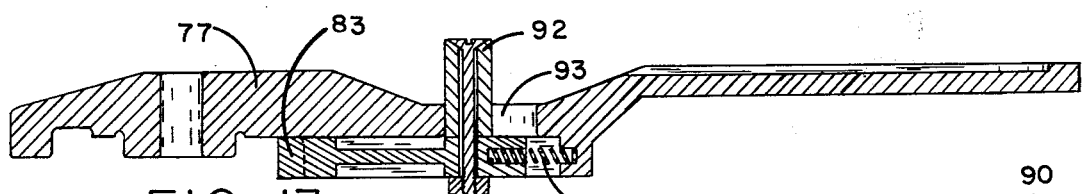
FIG. 13 is a sectional view taken on a line 13—13 of FIG. 11.
Figure 12:
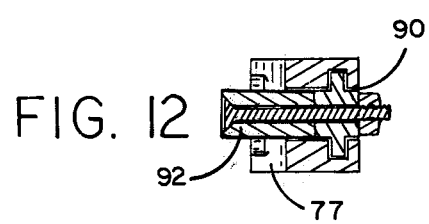
FIG. 12 is a sectional view taken on a line 12—12 of FIG. 11.
Figure 11:
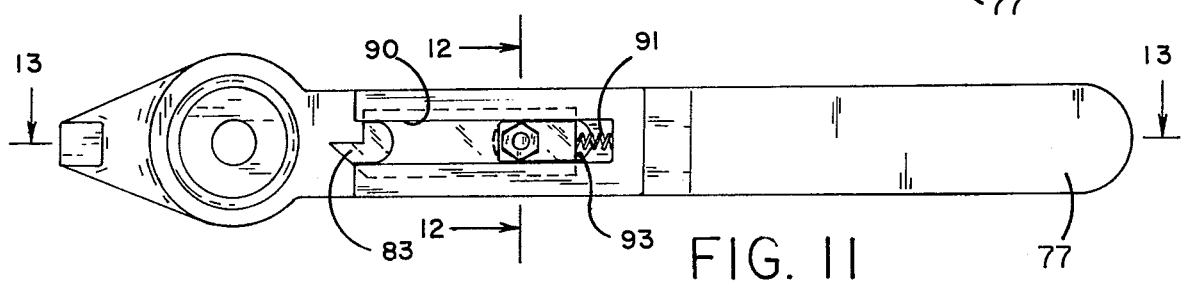
FIG. 11 is a bottom plan view of the ratchet arm shown in FIG. 9.

The handle itself is shown in FIG. 11 from beneath. The pawl 83 is guided by an open slot 90 in the handle and forced to the left (as viewed in FIG. 11) by a spring 91. The pawl itself has longitudinal ridges on both sides which slide in longitudinal slots on the side walls of the major guide slot 90 as shown in FIG. 12 in a sectional view taken on a line 12—12 in FIG. 11. A knob 92 which passes through a closed slot 93 in the handle (as shown in a sectional view in FIG. 13 taken on a line 13—13 of FIG. 11), is secured to the pawl by a nut and bolt. The slot 90 limits the forward travel of the pawl. As the handle is turned, the pawl is forced back against the spring by the teeth 71 on the plate 70 (FIG. 8). The spring forces the pawl forward into locking position between the teeth. To release the tension on the peripheral cable, the knob 92 is manually operated to the right (as viewed in FIG. 13), thus forcing the pawl back against the spring 91 out of engagement with the teeth on the rim of the plate 70. For security against pilferage, the handle may be provided with means for locking it in the cable tensioning position, or for otherwise providing a security seal for the handle in the cable tensioning position.

Although particular embodiments of the invention have been described and illustrated herein, it is recognized that modifications and variations may readily occur to those skilled in the art. It is therefore intended that the claims be interpreted to cover such modifications and variations.

What is claimed is:

1. A cover for an opening in a cargo container comprising a curtain of flexible material, means for securing said curtain to said container along one side and on the outside of said opening, flanging means rigidly secured to said container for providing a flange around said opening substantially uninterrupted from one end to the other of said curtain securing means, said flange standing out away from said container and extending in a direction away from said opening, thereby providing a channel from substantially one end to the other of said curtain securing means, said curtain being of a size and shape to overhang said flange, and having along its edge a tunnel running substantially uninterrupted from one end to the other of said curtain securing means, a cable inserted in said curtain tunnel, said cable having one end anchored at said one end of said curtain securing means, tensioning means anchored to said container at the other end of said curtain securing means for pulling said cable taut in said channel, and releasable latching means for latching said tensioning means with tension on said cable.

2. A flexible cover for an opening in a cargo container as defined in claim 1 wherein said tensioning means is comprised of a handle pivoted on a fixed axis, a ratchet for pivotal motion having its pivotal point on said axis, a sheave rigidly secured to said handle with its axis coincident with said pivotal axis of said handle, said sheave having a groove in its rim for said cable and means for securing the end of said cable to said sheave, whereby pivoting said handle in the direction to coil said cable onto said sheave pulls said cable tight in said channel around said container opening, and said ratchet latches said handle to hold said cable under tension.

3. A flexible cover for an opening in a cargo container as defined in claim 1 wherein said opening has at least two straight sides along which said flanging means provides said flange, said sides joining at a corner, and wherein said flange is omitted at said corner, the combination including a gusset rigidly secured to said container across said corner in said opening, a post protruding outwardly from said gusset, a fitting secured to said curtain at a point where said curtain fits over said post, said cable tunnel being omitted around said fitting and said fitting having a hole to permit it to be seated on said post, said fitting further having a sheave on the inside of said curtain with a groove on its rim adopted to receive said cable passing around said fitting, said sheave being secured to said fitting with its turning axis coincident with the axis of said fitting hole, and said fitting having a flange extending over said groove to hold said cable in said groove.

4. A flexible cover for an opening in a cargo container as defined in claim 3 wherein said opening is rectangular, and said flanging means is provided with said flange omitted around corners remote from said curtain securing means, each corner having a gusset and a post, and said curtain having two fittings, one on each corner of said curtain at a point which fits over a corner post.

5. A flexible cover for an opening in a cargo container as defined in claim 4 including a pair of diagonal cables inside said curtain for reinforcing said curtain each of said cables being rigidly secured at one end to a separate end of said curtain securing means and anchored at the other end to a curtain fitting in the diagonally opposite corner of said curtain.

6. A flexible cover for an opening in a cargo container comprising a curtain of flexible material, a cable, releasable cable tensioning means, means for fastening said curtain to an outside wall of said container along one side of said opening, and flanging means around said opening from one end of said curtain fastening means to the other for providing a flange which stands away from said container and turns back from the outer edge of said opening in a direction away from said opening in a plane substantially parallel to said outside wall, said cable extending around said curtain through a substantially continuous tunnel along the periphery thereof from one end of said curtain fastening means to the other, one end of said cable being securely fixed at the one end of said curtain fastening means, and the other end of said cable being secured at the other end of said curtain fastening means by said cable tensioning means, said curtain being shaped to fit over the opening with enough overlap for the cable to fit over said flange so that when the curtain is placed in a covering position over said opening with said cable over said flange, and the cable is pulled taut by said releasable tensioning means, said curtain is sealed against said flange around the container opening.

7. The combination of claim 6 wherein said opening is rectangular to facilitate loading and unloading cargo, and wherein each corner of said opening opposite said curtain fastening means is reinforced by a gusset having a post protruding outwardly, and wherein said tunnel for said cable is omitted at each corner of the curtain opposite said curtain fastening means, the combination further comprising a sheave fastened to the inside of the curtain at each corner opposite said curtain fastening means, said sheave being fastened by a fitting having a hollow hub, and said sheave turning on said hub, whereby to secure the corners of said curtain in place while said cable is being tensioned, the hub of each of said curtain fittings is seated over a gusset at a separate corner of said opening.

8. The combination of claim 7 including a pair of diagonal cables inside said curtain for reinforcing said curtain, each of said cables being rigidly secured at one end to a separate end of said curtain securing means and secured at the other end to a curtain fitting in the diagonally opposite corner of said curtain.

9. The combination of claim 7 wherein each fitting has a knob on the outside of the curtain to facilitate removing the fitting from its corner post.

10. The combination of claim 6 wherein said curtain fastening means is comprised of a flat rigid strip wrapped at least one full turn around said strip and a hollow rectangular header open throughout its entire length on one side and having a side opposite the opening fastened and sealed to the outside of said container, two flanges on the inside of said header, and opposing each other on horizontal sides of the header, for backing said rigid strip inserted into said header broadside, and a third flange outside of and parallel to one of said opposing flanges on the side of said header remote from said opening to retain one edge of the prewrapped strip in position, the direction of wrapping for the curtain being so selected that the curtain emerged from the opening in said header at the edge of the strip between two adjacent flanges, whereby any force of the curtain pulling that edge of the strip outwardly presses the opposite edge of the prewrapped strip inwardly against the opposite flange to assure a tight seal of the curtain in said header.

* * * * *